(12) United States Patent
Caroselli

(10) Patent No.: US 12,370,641 B2
(45) Date of Patent: Jul. 29, 2025

(54) WORKING HEAD FOR CUTTING MACHINE OF SHEET MATERIALS

(71) Applicant: SASSOMECCANICA S.P.A., Monteprandone (IT)

(72) Inventor: Tommaso Caroselli, San Benedetto del Tronto (IT)

( * ) Notice: Subject to any disclaimer, the term of this patent is extended or adjusted under 35 U.S.C. 154(b) by 313 days.

(21) Appl. No.: 17/816,498

(22) Filed: Aug. 1, 2022

(65) Prior Publication Data
US 2023/0040819 A1 Feb. 9, 2023

(30) Foreign Application Priority Data

Aug. 4, 2021 (IT) .................. 102021000021188

(51) Int. Cl.
*B23P 23/02* (2006.01)
*B23C 1/12* (2006.01)
*B23Q 39/02* (2006.01)
*B28D 1/00* (2006.01)
*B28D 1/04* (2006.01)
*B28D 1/18* (2006.01)
(Continued)

(52) U.S. Cl.
CPC ............... *B23P 23/02* (2013.01); *B23C 1/12* (2013.01); *B28D 1/003* (2013.01); *B23C 1/002* (2013.01); *B23Q 1/012* (2013.01); *B23Q 2039/002* (2013.01); *B23Q 39/027* (2013.01); *B28D 1/04* (2013.01); *B28D 1/042* (2013.01); *B28D 1/043* (2013.01); *B28D 1/18* (2013.01); *Y10T 29/5107* (2015.01); *Y10T 409/307672* (2015.01); *Y10T 409/308288* (2015.01)

(58) Field of Classification Search
CPC ................ B28D 1/003; B23P 23/02; Y10T 409/307728; Y10T 409/308288; Y10T 409/307672; Y10T 409/308232; Y10T 409/308512; B23Q 1/012; B23C 1/002; B27C 9/04
USPC ..................... 409/202, 212, 201, 211, 216
See application file for complete search history.

(56) References Cited

U.S. PATENT DOCUMENTS 1,778,132 A * 10/1930 Wegner ................ B24B 7/224
                                                               200/84 R
4,945,958 A * 8/1990 Shoda .................. B23Q 39/024
                                                                144/1.1
(Continued)

FOREIGN PATENT DOCUMENTS

CN        111361018 A * 7/2020
EP          1099522 A2 * 5/2001
(Continued)

OTHER PUBLICATIONS

Machine Translation of JP 07-124907-A, which JP '907 was published May 1995.*

*Primary Examiner* — Erica E Cadugan
(74) *Attorney, Agent, or Firm* — Egbert, McDaniel & Swartz, PLLC

(57) ABSTRACT

A working head for a cutting machine having a frame, and a cutting disc assembly supported by the frame. The cutting disc assembly having a cutting disc and a first driver rotatably moving the cutting disc around an axis of rotation of the cutting disc. A milling cutter assembly is supported by the frame. The milling cutter assembly has a milling cutter and a second driver that rotatably moves the cutting disc around an axis of rotation of the cutter.

8 Claims, 9 Drawing Sheets

(51) Int. Cl.
*B23C 1/00* (2006.01)
*B23Q 1/01* (2006.01)
*B23Q 39/00* (2006.01)

(56) References Cited

U.S. PATENT DOCUMENTS

| | | | | | |
|---|---|---|---|---|---|
| 6,006,735 | A | * | 12/1999 | Schlough | B24B 9/06 451/65 |
| 7,954,216 | B2 | * | 6/2011 | Sturm | B23B 39/161 144/35.2 |
| 2010/0263513 | A1 | * | 10/2010 | Czeck | B23Q 1/032 29/428 |
| 2014/0309784 | A1 | * | 10/2014 | Toncelli | B23D 47/02 700/275 |
| 2018/0333790 | A1 | * | 11/2018 | Urban | B23Q 39/024 |

FOREIGN PATENT DOCUMENTS

| | | | |
|---|---|---|---|
| IT | UB-20154045 A | * | 3/2017 |
| JP | 04-250911 A | * | 9/1992 |
| JP | 07-124907 A | * | 5/1995 |

\* cited by examiner

WORKING HEAD FOR CUTTING MACHINE OF SHEET MATERIALS

CROSS-REFERENCE TO RELATED APPLICATIONS

Not applicable.

BACKGROUND OF THE INVENTION

1. Field of the Invention

The present invention relates to a working head for a cutting machine of sheet materials and to a cutting machine, preferably a CNC cutting machine comprising the working head.

2. Description of Related Art Including Information Disclosed Under 37 CFR 1.97 and 37 CFR 1.98

Currently, CNC cutting machines include a working head for cutting glass, ceramic, marble and metal sheets.

Such machines are very often used for cutting kitchen countertops usually provided with one or more holes or quadrangular openings suitable for accommodating a sink and/or cooktop. Said kitchen countertops are usually cut by means of a cutting disc mounted on the working head and operatively connected to driving means that rotate said cutting disc. The driving means comprise a motor including a shaft connected to the cutting disc by means of connection means.

Because of the diameter of the disc, the use of the cutting disc is impaired by a drawback that will be described hereinafter with reference to FIGS. 1, 1A and 1B.

FIG. 1 is a top view of a kitchen countertop (P) wherein a rectangular opening (PA) suitable for accommodating a sink or a cooktop is obtained by means of the cutting disc. The rectangular opening (PA) is defined by a perimetral edge (P1) and has four corners (px).

FIGS. 1A and 1B are sections of the kitchen countertop of FIG. 1 taken along the planes A-A and B-B of FIG. 1.

As shown in FIGS. 1, 1A and 1B, at each corner (px) of the rectangular opening (PA), the perimetral edge (P1) is not cut perfectly at 90° relative to the kitchen countertop (P) and extends for an arc of circumference that depends on the diameter of the cutting disc.

The working head only comprising the cutting disc does not allow a perfect cut to be made at the corners (px) and therefore additional finishing operations must be performed to complete the cut at the corners (px).

In order to finish the perimetral edge (P1) at the corners (px), the use of the cutting disc is combined with the use of a milling cutter.

According to the prior art, the working head has only one drive shaft and therefore both the cutting disc and the milling cutter are mounted alternately on the working head of the cutting machine and are connected to the drive shaft of the working head by means of connection means.

More precisely, the cutting disc is mounted on the shaft and lies on a plane, which is known as cutting plane, perpendicular to the axis of the shaft, whereas the milling cutter is mounted on the shaft so that the axis of rotation of the milling cutter is aligned with the axis of the shaft.

In order to cut a kitchen countertop, it is necessary to:
a) mount the cutting disc on the working head by connecting it to the drive shaft by means of the connection means;
b) mount the milling cutter on the working head by connecting it to the drive shaft by means of the connection means;
c) place the kitchen countertop on a support surface of the cutting machine;
d) bring the cutting disc closer to the kitchen countertop;
e) make the cut with the cutting disc;
f) block the cutting machine;
g) dismount the cutting disc from the working head;
h) unblock the cutting machine;
i) rotate the working head by 90° so as to bring the milling cutter in correspondence with the cut that was previously made by the cutting disc;
j) perform the milling;
k) rotate the working head by 90° bringing it back to the position it had in step d);
l) block the cutting machine;
m) mount the cutting disc on the working head;
n) unblock the cutting machine;

The operating steps f) and g), as well as l) and n) are necessary for the safety of the operator, since the mounting and dismounting operations of the cutting disc from the shaft must be done when the machine is stopped, preventing the operation of the motor that drives the shaft on which the milling cutter and the cutting disc are mounted.

The motor rotates the shaft at different speeds depending on the type of tool; in order to operate perfectly, the cutting disc must rotate at a speed comprised between 800 rpm and 2800 rpm whereas in order to operate perfectly, the milling cutter must rotate at a speed comprised between 6000 rpm and 10000 rpm.

Due to the centrifugal force, the high speeds imparted to the motor shaft during the use of the milling cutter would result in a possible failure of the cutting disc if the cutting disc was still connected to the shaft, making the use of the machine extremely dangerous. The operating steps f), g), h), l), m) and n) were specifically provided to overcome such a problem.

Such a solution, which provides for stopping the cutting machine and dismounting the cutting disc whenever the milling cutter is to be used, is impaired by some drawbacks. In fact, such a replacement requires to continuously stop the machine, increasing the production time of each kitchen countertop. The dismounting of the cutting disc and the mounting the milling cutter, and vice versa, can increase the risk that the cutting disc and/or the milling cutter are not properly set. The repeated mounting and dismounting of the cutting disc may result in the misalignment of the cutting disc with respect to the cutting plane. In addition, such manual replacement increases the number of operations carried out by the operator, with a higher risk of injury.

Machines provided with a waterjet system in addition to the cutting disc are known in order to solve these drawbacks. The waterjet system includes a high-pressure hydraulic line and a nozzle that directs water at very high pressure (3000-4000 bar) onto the sheet in such a way as to cut the sheet. Such a system allows a much more precise and easily oriented cut with the possibility of creating extremely complex shapes.

However, the machines with a water jet system have high purchase and maintenance costs compared to machines with a milling tool.

BRIEF SUMMARY OF THE INVENTION

It is the purpose of the present invention to overcome the drawbacks of the prior art by devising a working head for a cutting machine that is versatile and capable of performing a cut by means of the cutting disc and of finishing the cut with a milling cutter with very high precision.

Another purpose is to provide such a working head of a cutting machine that is safe and reliable and capable of using the cutting disc and the milling cutter in the working head, without the need to dismount the tools.

BRIEF DESCRIPTION OF THE SEVERAL VIEWS OF THE DRAWINGS

For the sake of explanatory clarity, the description of the working head according to the invention continues with reference to the appended drawings, which are for illustrative and non-limiting purposes only, wherein:

FIGS. 1A and 1B are sectional views of the kitchen countertop taken along the planes A-A and B-B of FIG. 1;

DETAILED DESCRIPTION OF THE INVENTION

Figure 1:
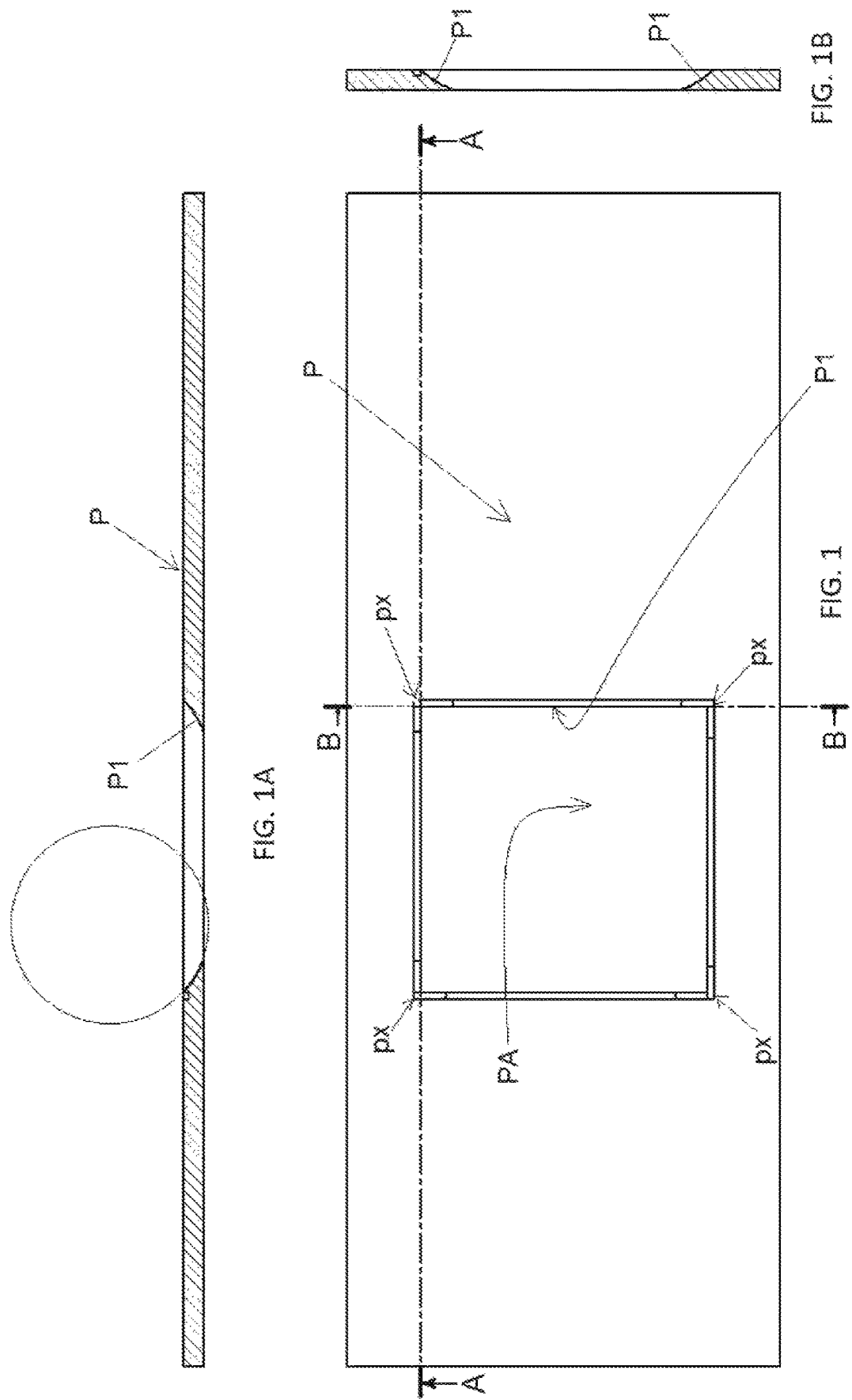
FIG. 1 is a top view of a kitchen countertop wherein a rectangular opening is cut out by a cutting disc.

With reference to FIGS. 2 to 10, a working head according to the invention is described, which is indicated collectively with reference numeral 100.

Figure 2:
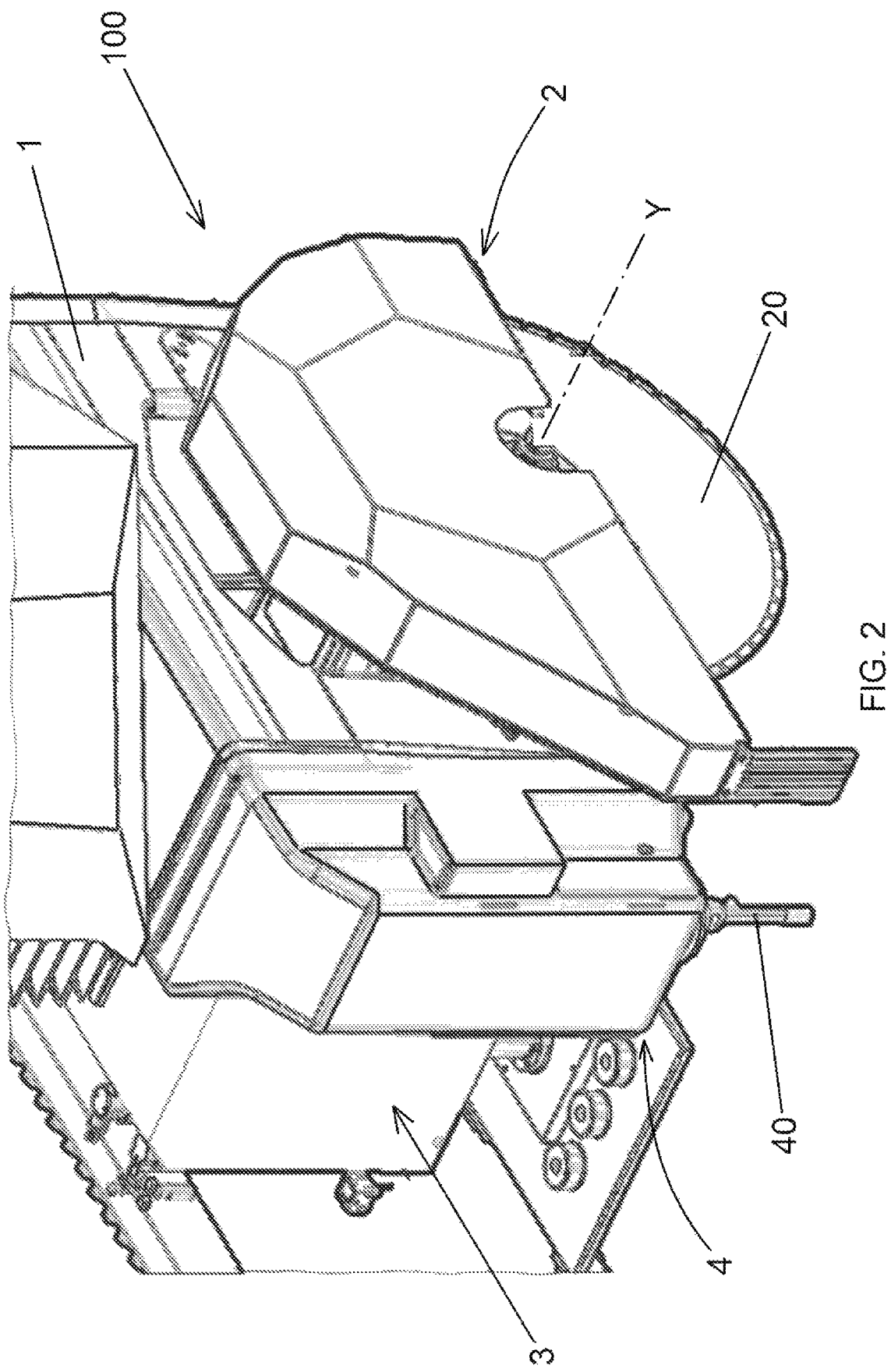
FIGS. 2 and 3 are axonometric views of a working head according to the invention.
Figure 3:
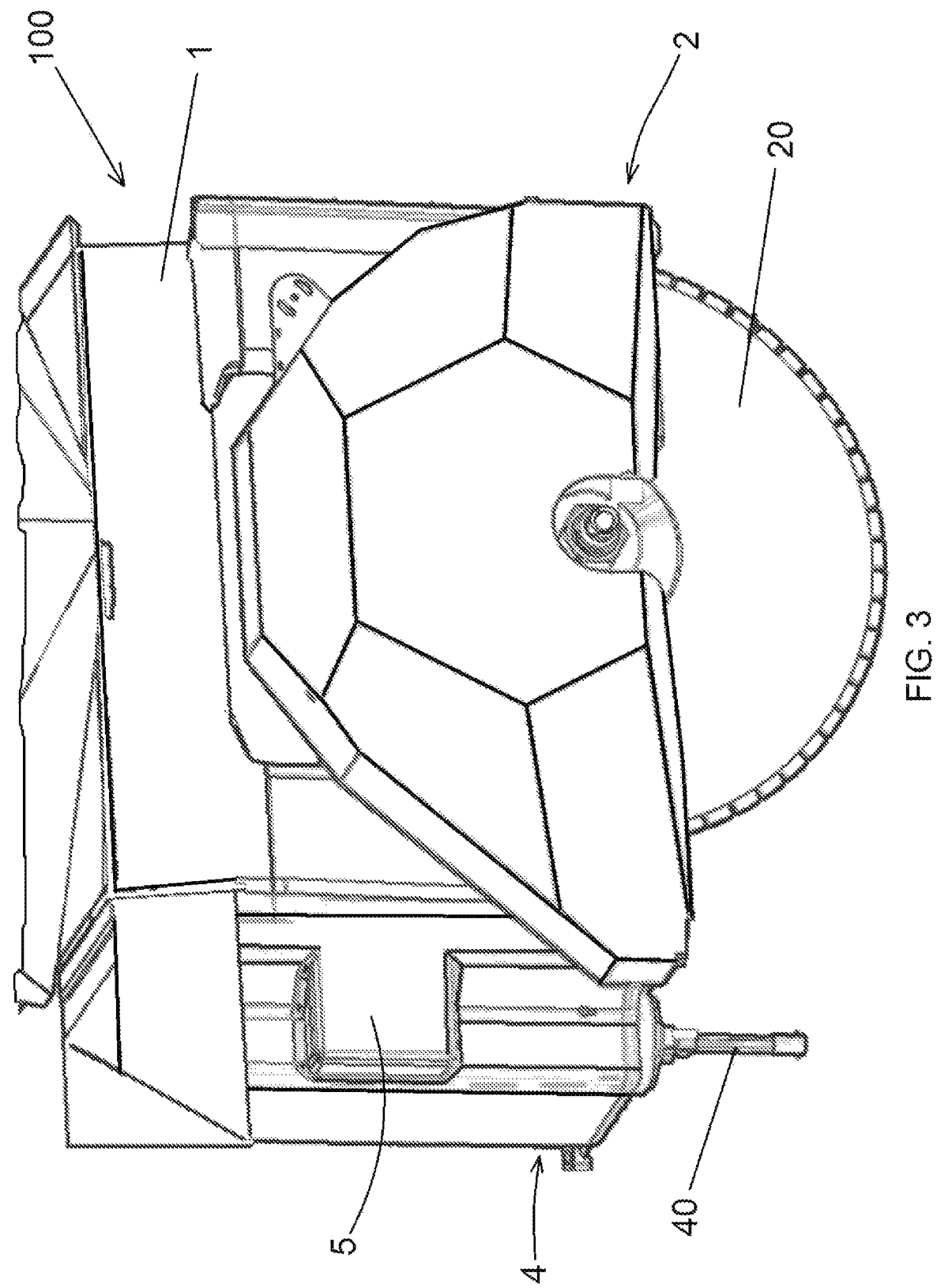

Now with reference to FIGS. 2 and 3, the working head (100) comprises:
a frame (1),
a cutting disc assembly (2) supported by the frame (1), and
a milling cutter assembly (4) supported by the frame (1).

The cutting disc assembly (2) includes a cutting disc (20) and first driving means (3) operatively connected to the cutting disc (20) to rotate the cutting disc around an axis of rotation (Y) of the cutting disc.

Figure 4:
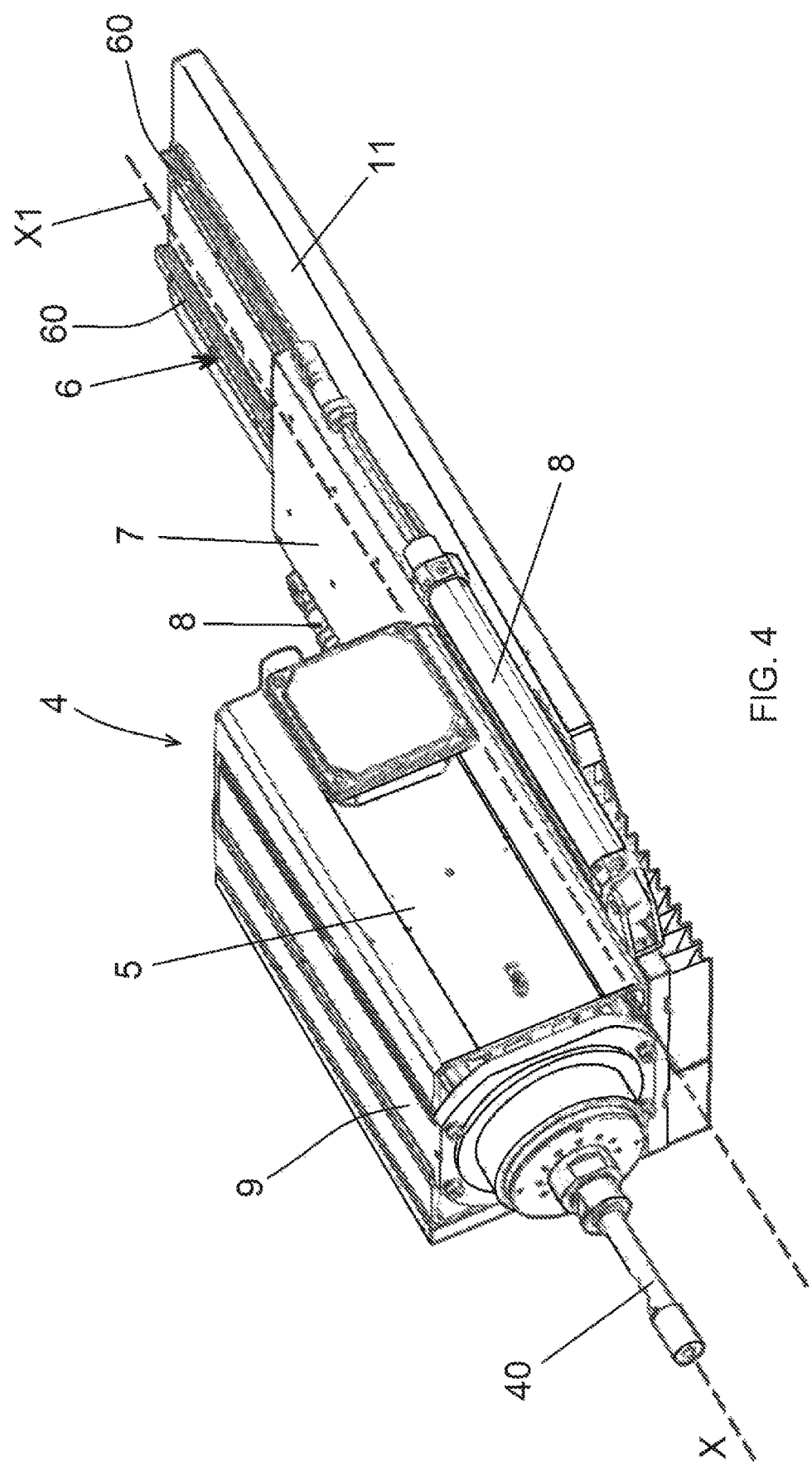
FIG. 4 is a view of a milling cutter assembly and of connection means used to connect the milling cutter assembly to a frame of the working head according to the invention.
Figure 4A:
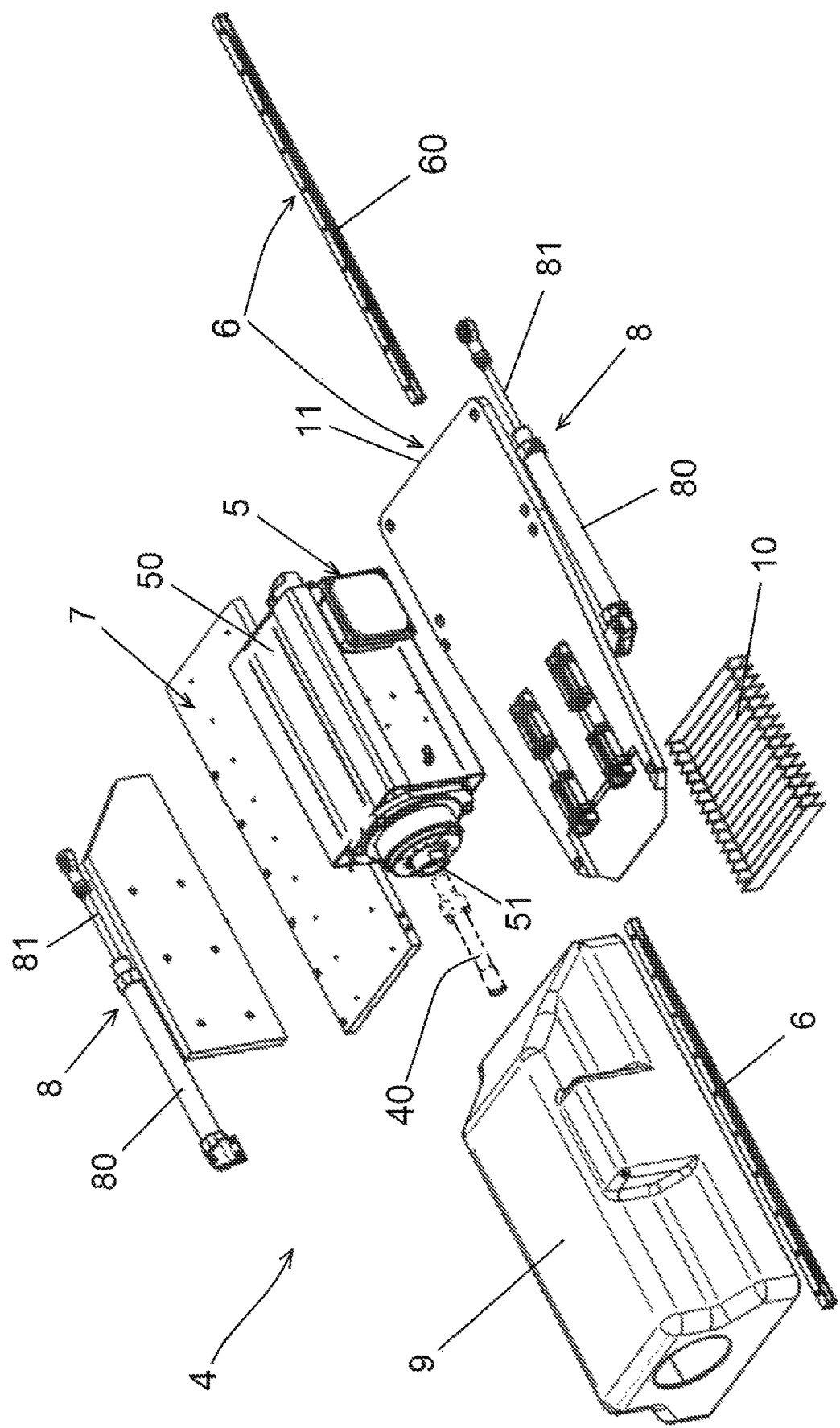
FIG. 4A is an exploded view of the milling cutter assembly of FIG. 4.

Referring to FIGS. 4 and 4A, the milling cutter assembly (4) includes a milling cutter (40) and second driving means (5) operatively connected to the milling cutter (40) to rotate the milling cutter around an axis of rotation (X) of the milling cutter.

The milling cutter (40) has a diameter size comprised between 5 mm and 120 mm; whereas the cutting disc (20) has a diameter size comprised between 350 mm and 900 mm.

The expression "milling cutter" refers to a core bit comprising a shank and a tip whereon abrasive means are applied. By way of example, the commonly used abrasive media include a diamond powder.

The first driving means (3) are suitable for rotating the cutting disc (20) around its axis at a speed of 800 to 2800 rpm. The second driving means (5) are suitable for rotating the milling cutter (40) around its axis at a speed of 6000 to 10000 rpm.

The first driving means (3) include:
a motor with a shaft, and
a connection means connecting the shaft with the cutting disc (20).

The second driving means (5) include:
a motor (50) with a shaft, and
a connection means (51) connecting the shaft with the milling cutter (40).

The milling cutter assembly (4) is slidingly mounted relative to the frame (1) in order to slide or translate along a sliding axis (X1) parallel to the axis of rotation (X) of the milling cutter.

For this purpose, the working head (100) includes:
guiding means (6) connected with the frame (1),
a slide (7) connected to the milling cutter assembly (4) and slidingly mounted on the guiding means (6) to slide along the sliding axis (X1), and
at least one actuator (8) connected to the frame (1) and to the slide (7) to move the slide (7).

The guiding means (6) include a plate (11) fixed to the frame (1) and rails (60) mounted on the plate (11).

The slide (7) supports the second driving means (5) that move the milling cutter (40) so that the axis of rotation (X) of the milling cutter (40) is parallel to the sliding axis (X1) of the guiding means (6) and parallel to the cutting disc (20).

The actuator (8) includes a cylinder (80) fixed to the plate (11) and a piston (81) fixed to the slide (7).

Also with reference to FIG. 4A, the milling cutter assembly (4) includes a casing (9), which covers the second driving means (5). A bellows element (10) is connected to the slide (7) and to the plate (11) of the frame (1). The function of the bellows element (10) is to protect the slide (7) and the guiding means (6) from any waste produced during the use of the working head (100).

Figure 5A:
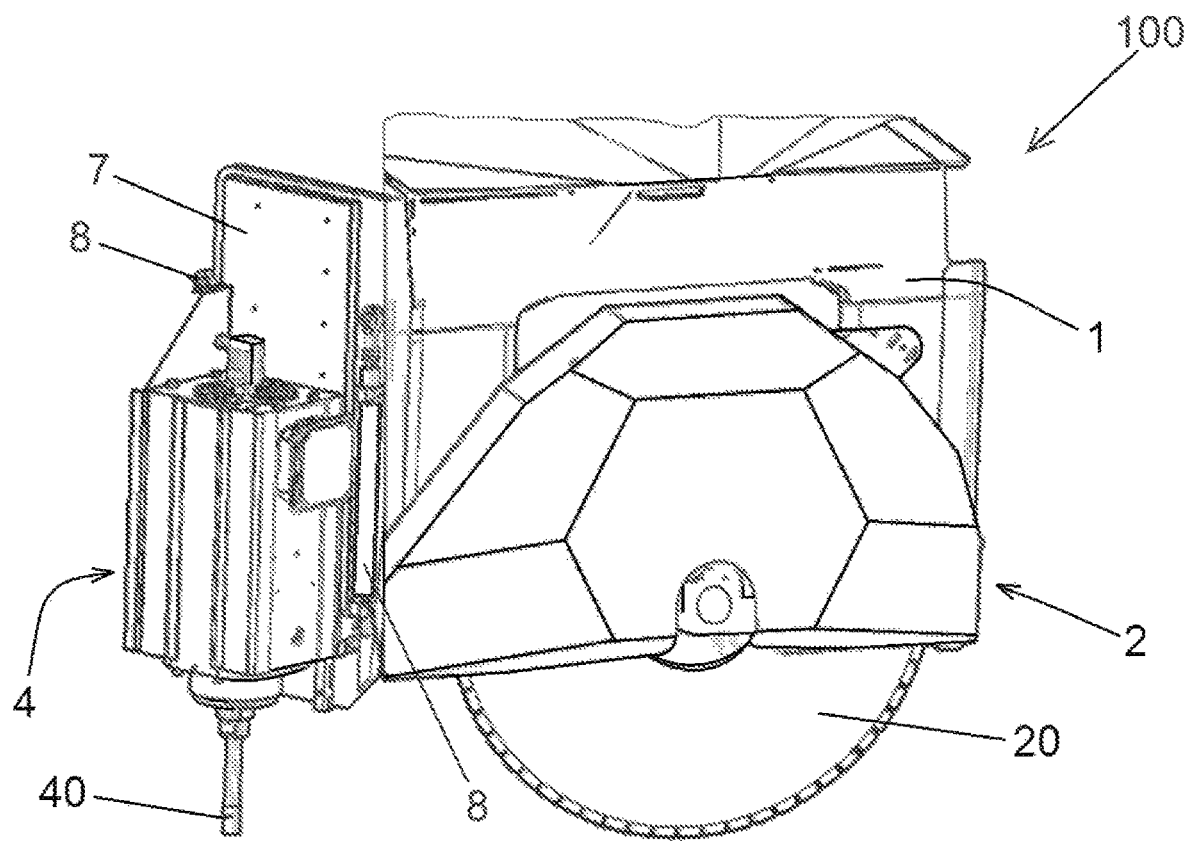
FIG. 5A is 5B are views as FIG. 3, illustrating the milling cutter in idle position and in working position, respectively.
Figure 5B:
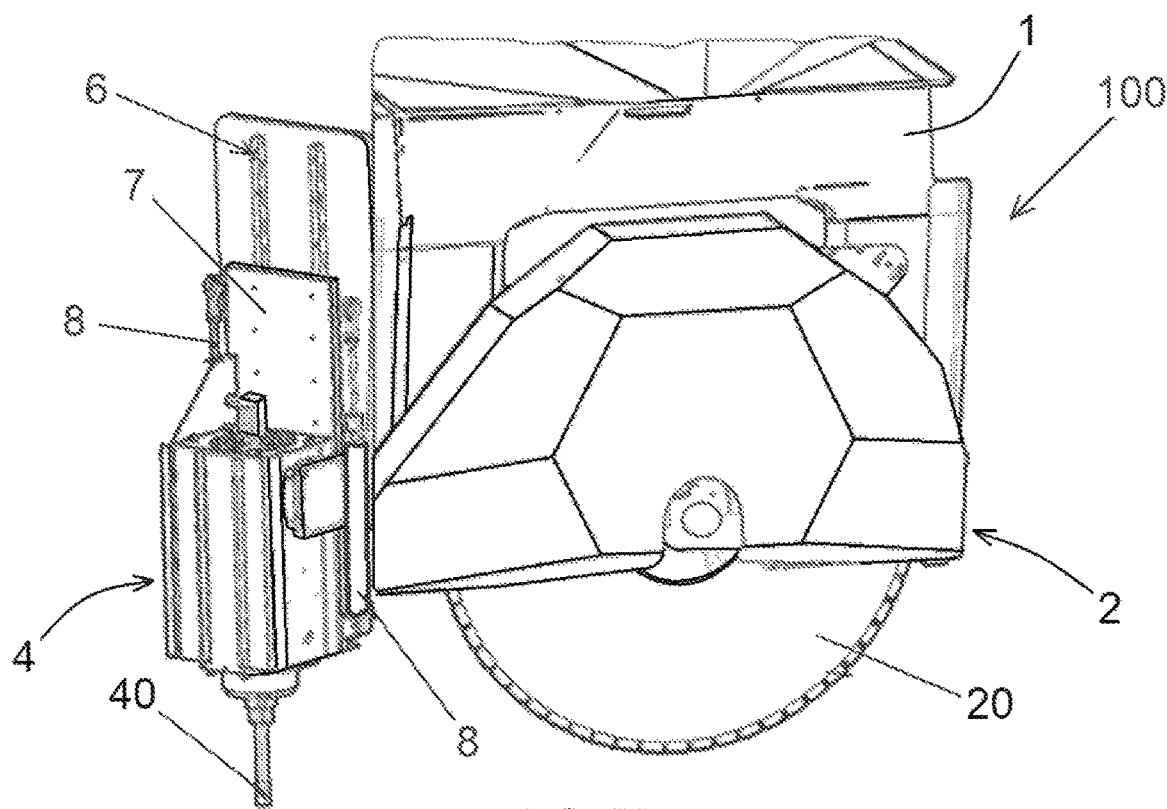

Referring to FIGS. 5A and 5B, two actuators (8) move the slide (7) along the guiding means (6) in such a way that the milling cutter (40) moves from an idle position, wherein the milling cutter (40) does not protrude with respect to the cutting disc (20), to a working position, wherein the milling cutter (40) protrudes with respect to the cutting disc (20).

Although FIGS. 5A and 5B do not show the bellows element, when the milling cutter (40) is in idle position (FIG. 5A), the bellows element (10) is in contracted position; when the milling cutter (40) is in working position (FIG. 5B), the bellows element (10) is in elongated position.

Figure 6:
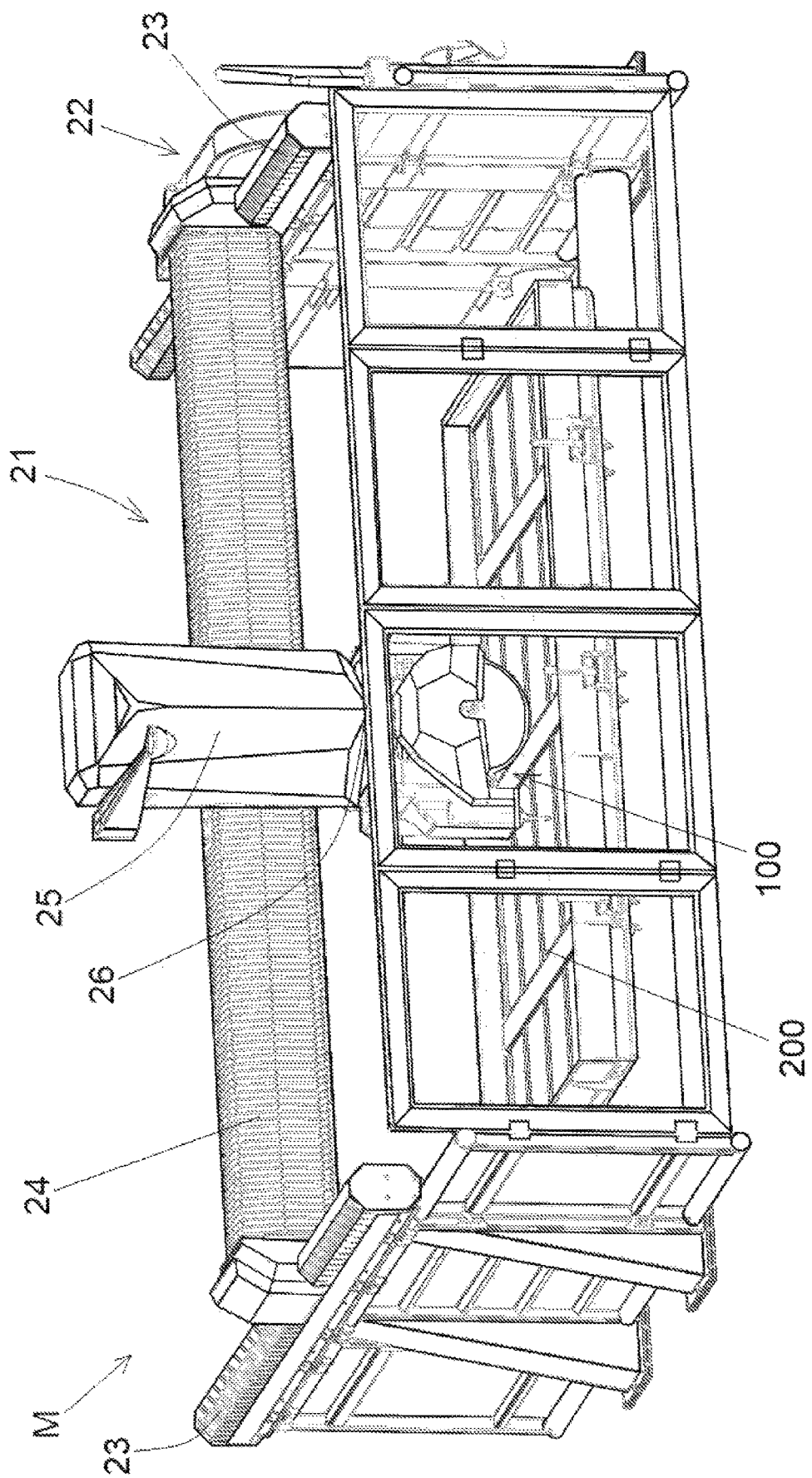
FIG. 6 is an axonometric view of a disc cutting machine provided with a working head according to the invention.

FIG. 6 illustrates a disc cutting machine (M) comprising:
a working head (100) according to the invention,
supporting and driving means (21) that support and move the working head (100), and
a support surface (200) disposed under the working head (100) and suitable for supporting a sheet of material to be cut.

The supporting and driving means (21) support the working head (100), allowing its movement in at least one direction orthogonal to the support surface (200), preferably in three axes orthogonal to each other. The supporting and driving means (21) comprise an overhead crane (22) including two side frames (23) and a beam (24) slidingly mounted on the side frames (23). The two ends of the beam (24) are slidingly mounted on the side frames (23).

The supporting and driving means (21) are provided with rails on the side frames (23) and slides at the ends of the beam (24); thus, the two slides can slide along the two rails so as to move the beam (24) on the side frames (23).

The supporting and driving means (21) also include a trolley (25) slidingly mounted on the beam (24) and a shaft (26) that supports the working head (100). The trolley (25) includes slides for sliding along a guide provided on the beam (24).

The shaft (26) is mounted in such a way to slide vertically in the trolley (25) and is moved up and down with respect to the trolley (25), thus moving the working head (100) along a vertical trajectory approaching and receding with respect to the support surface (200).

In a different embodiment of the machine (M), the supporting and driving means (21) may include a three-axis robot, or a mixed robot with linear and rotary axes, or an anthropomorphic robot.

Figure 7:
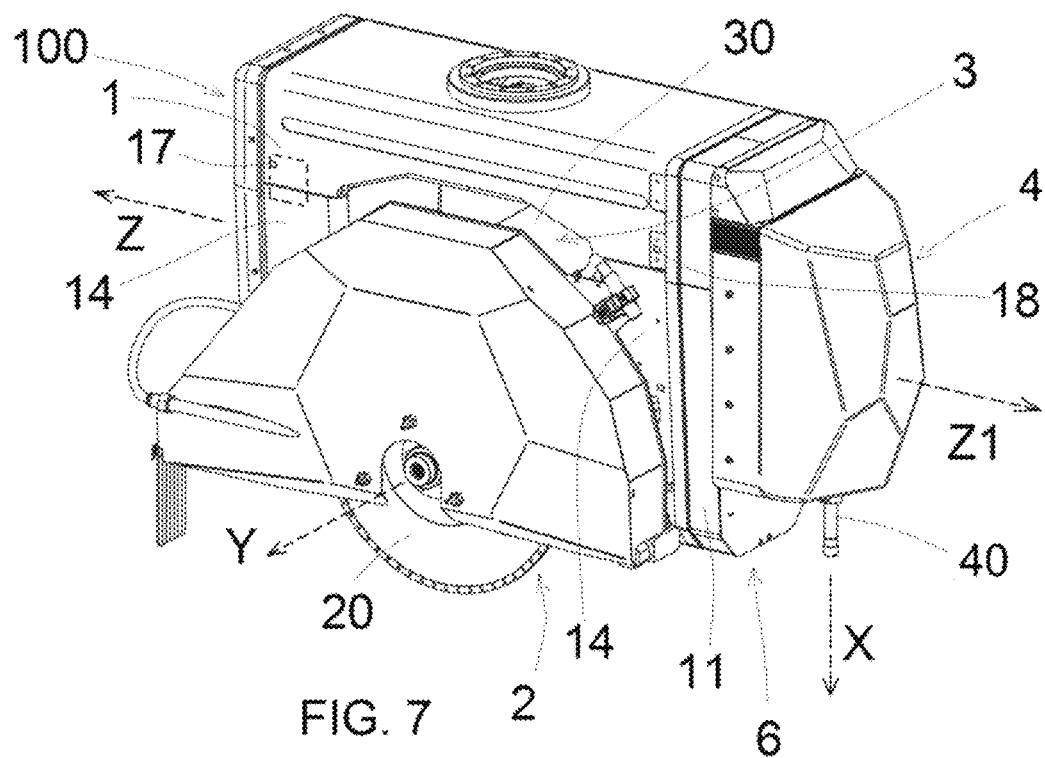
FIG. 7 is a perspective view of a second embodiment of the working head according to the invention with the milling cutter in idle position.

Referring to FIG. 7, the frame (1) of the working head (100) is shaped like a U-shaped fork with two arms (14). The first driving means (3) include a casing (30) that contains the motor that rotates the cutting disc (20). The casing (30) is arranged between the two arms (14) of the frame (1). The casing (30) is rotatably mounted in the frame (1) so that it can rotate around a first tilt axis (Z) to vary the tilt of the cutting disc (20).

First rotating means (17) are mounted in the frame (1) to rotate the casing (30). The first rotating means (17) may be an electric motor having a drive shaft connected to the casing (30) directly or via a transmission.

The guiding means (6) of the milling cutter assembly are rotatably mounted on an arm (14) of the frame so as to rotate around a second tilt axis (Z1) to vary the tilt of the axis of rotation axis (X) of the milling cutter (40).

The second tilt axis (Z1) of the milling cutter assembly (4) may coincide with the first tilt axis (Z) of the cutting disc assembly or may be parallel to the first tilt axis (Z) of the cutting disc assembly.

Second rotating means (18) are mounted in the frame (1) to rotate the guiding means (6). The second rotating means (18) may be an electric motor having a drive shaft connected to the guiding means (6) directly or via a transmission.

Figure 8:
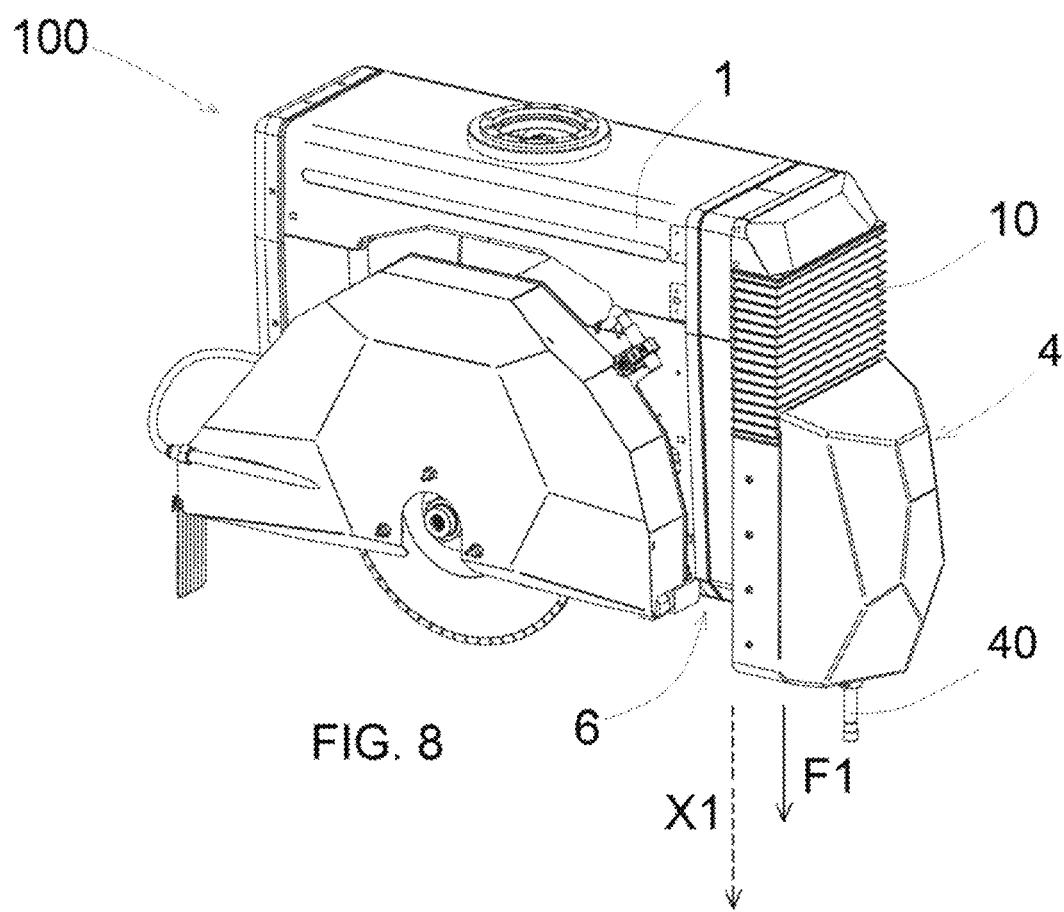
FIG. 8 is a perspective view of the working head of FIG. 7 with the milling cutter in working position.

FIG. 8 illustrates the situation where the milling cutter assembly (4) has translated downwards with respect to the guiding means (6), along the axis of translation (X1), in the direction of the arrow F1.

Figure 9:
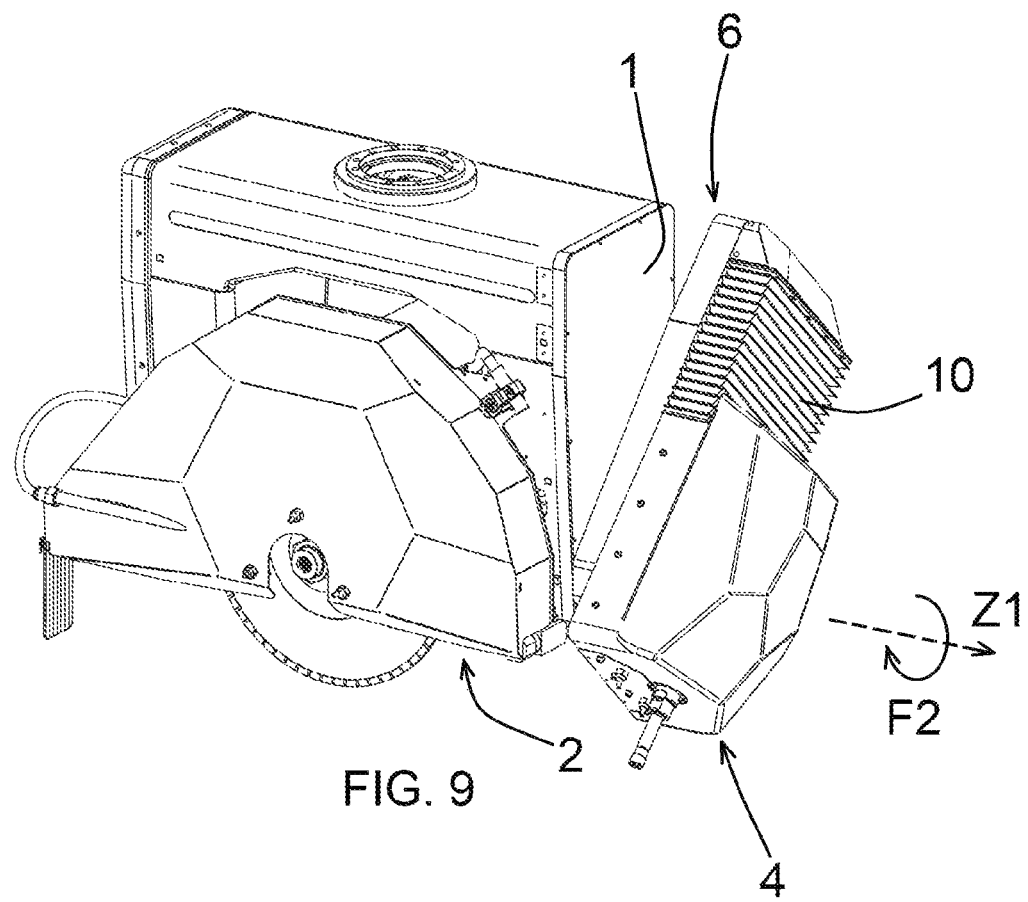
FIG. 9 is a perspective view of the working head of FIG. 7, with the cutter in tilted position.

FIG. 9 illustrates the situation in which the guiding means (6) rotated relative to the frame (1), around the second tilt axis (Z1) in the direction of the arrow F2.

Figure 10:
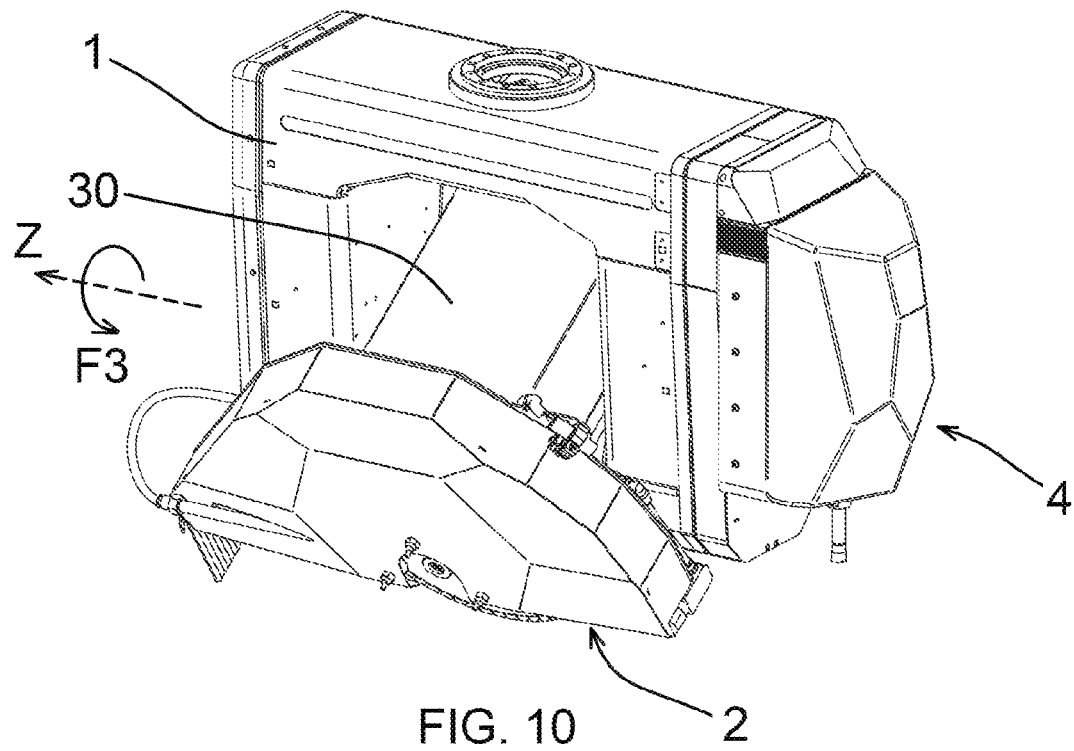
FIG. 10 is a perspective view of the working head of FIG. 7, with the cutting disc in tilted position.

FIG. 10 illustrates the situation in which the casing (30) of the first driving means (3) rotated relative to the frame (1), around the first tilt axis (Z) in the direction of the arrow F3.

The advantages of the working head for a cutting machine according to the invention, which provides for cutting the kitchen countertop without having to dismount the cutting disc from the working head to mount the milling cutter, appear obvious.

Numerous variations and modifications of detail may be made to the present embodiments of the invention, which are within the reach of a person skilled in the art, but still within the scope of the invention as expressed by the appended claims.

I claim:

1. A working head for a cutting machine, the working head comprising:
a frame;
a cutting disc assembly supported by said frame, said cutting disc assembly having a cutting disc and a first drive, the first drive being cooperative with the cutting disc so as to rotate the cutting disc around an axis of rotation of the cutting disc;
a milling cutter assembly supported by said frame, said milling cutter assembly having a milling cutter and a second drive, the second drive being cooperative with the milling cutter so as to rotate the milling cutter around an axis of rotation of the milling cutter, said milling cutter assembly slidably mounted relative to said frame such that said milling cutter assembly is slidable along a sliding axis parallel to the axis of rotation of the milling cutter;
a guide connected to said frame;
a slide connected to said milling cutter assembly, said slide being slidably mounted on said guide so as to slide along the sliding axis; and
at least one actuator connected to said frame and to said slide so as to selectively move said slide, wherein the first drive has a casing rotatably mounted to said frame so as to rotate around a first tilt axis so as to vary an angle of inclination of the cutting disc, wherein said guide is rotatably mounted on said frame such that said guide is rotatable about a second tilt axis so as to vary an inclination of the axis of rotation of said milling cutter, wherein the second tilt axis coincides with the first tilt axis.

2. The working head of claim 1, wherein a second motor is mounted in said frame and connected to said guide so as to rotate said guide.

3. The working head of claim 2, wherein a first motor is mounted in said frame so as to rotate the casing.

4. The working head of claim 1, wherein said milling cutter has a diameter of between 5 millimeters and 120 millimeters, the second drive rotating said milling cutter at a speed of between 6000 rpm and 10,000 rpm.

5. The working head of claim 1, wherein the cutting disc has a diameter of between 350 millimeters and 900 millimeters, the first drive rotating the cutting disc at a speed of between 800 rpm and 2800 rpm.

6. A working head for a cutting machine, the working head comprising:
a frame;
a cutting disc assembly supported by said frame, said cutting disc assembly having a cutting disc and a first drive, the first drive being cooperative with the cutting disc so as to rotate the cutting disc around an axis of rotation of the cutting disc;
a milling cutter assembly supported by said frame, said milling cutter assembly having a milling cutter and a second drive, the second drive being cooperative with the milling cutter so as to rotate the milling cutter around an axis of rotation of the milling cutter, said milling cutter assembly slidably mounted relative to said frame such that said milling cutter assembly is slidable along a sliding axis parallel to the axis of rotation of the milling cutter;
a guide connected to said frame;
a slide connected to said milling cutter assembly, said slide being slidably mounted on said guide so as to slide along the sliding axis; and
at least one actuator connected to said frame and to said slide so as to selectively move said slide, wherein the first drive has a casing rotatably mounted to said frame so as to rotate around a first tilt axis so as to vary an angle of inclination of the cutting disc, wherein said guide is rotatably mounted on said frame such that said guide is rotatable about a second tilt axis so as to vary an inclination of the axis of rotation of said milling cutter, wherein said frame has a U-shaped fork configuration and has a pair of arms, the casing of the first drive being positioned between the pair of arms of said frame, wherein said guide is mounted on one of the pair of arms of said frame.

7. The working head of claim 6, wherein said milling cutter has a diameter of between 5 millimeters and 120 millimeters, the second drive rotating said milling cutter at a speed of between 6000 rpm and 10,000 rpm.

8. The working head of claim 6, wherein the cutting disc has a diameter of between 350 millimeters and 900 millimeters, the first drive rotating the cutting disc at a speed of between 800 rpm and 2800 rpm.

\* \* \* \* \*